(12) United States Patent  
Rogers

(10) Patent No.: US 8,245,580 B2
(45) Date of Patent: Aug. 21, 2012

(54) COMPLIANT COIL FORM

(75) Inventor: Steven Bruce Rogers, Minnetonka, MN (US)

(73) Assignee: Rosemount Inc., Eden Prairie, MN (US)

( * ) Notice: Subject to any disclaimer, the term of this patent is extended or adjusted under 35 U.S.C. 154(b) by 567 days.

(21) Appl. No.: 12/572,722

(22) Filed: Oct. 2, 2009

(65) Prior Publication Data

US 2011/0079089 A1   Apr. 7, 2011

(51) Int. Cl.
*G01F 1/56* (2006.01)
*H01F 17/04* (2006.01)

(52) U.S. Cl. ............... 73/861.08; 73/861.11; 73/861.12; 336/221

(58) Field of Classification Search ........ 73/861–861.15
See application file for complete search history.

(56) References Cited

U.S. PATENT DOCUMENTS

| 1,127,979 | A |   | 2/1915  | Fassett |
|---|---|---|---|---|
| 1,588,228 | A |   | 6/1926  | Hotchkiss |
| 2,915,256 | A |   | 12/1959 | Bruhn |
| 3,372,589 | A | * | 3/1968  | Mannherz .................. 73/861.15 |
| 3,406,569 | A |   | 10/1968 | Rohmann |
| 3,424,466 | A | * | 1/1969  | Foot .............................. 369/171 |
| 3,479,871 | A |   | 11/1969 | Cushing |
| 3,690,172 | A | * | 9/1972  | Ketelsen et al. ........... 73/861.12 |
| 3,824,856 | A |   | 7/1974  | Yard |
| 4,403,933 | A |   | 9/1983  | Davis et al. |
| 4,434,666 | A | * | 3/1984  | Hemp et al. ................ 73/861.12 |
| 4,483,201 | A | * | 11/1984 | Haug ......................... 73/861.12 |
| 4,493,655 | A |   | 1/1985  | Groff |
| 4,679,442 | A |   | 7/1987  | Kubota |
| 4,774,844 | A |   | 10/1988 | Davis |
| 5,076,496 | A |   | 12/1991 | Lippmeier |
| 5,090,250 | A | * | 2/1992  | Wada ......................... 73/861.12 |
| 5,240,343 | A |   | 8/1993  | Strobl, Jr. |
| 5,263,374 | A | * | 11/1993 | Marsh ........................ 73/861.15 |
| 5,280,727 | A |   | 1/1994  | Hafner et al. |
| 5,409,558 | A |   | 4/1995  | Takahasi et al. |

(Continued)

FOREIGN PATENT DOCUMENTS

DE   19708857 A1   7/1998

(Continued)

OTHER PUBLICATIONS

International Search Report and Written Opinion from PCT Patent Application No. PCT/US2010/045845, filed Aug. 18, 2010.

*Primary Examiner* — Andre Allen
(74) *Attorney, Agent, or Firm* — Kinney & Lange, P.A.

(57) ABSTRACT

A coil assembly includes a coil form and a winding. The coil form includes a base defining a loop defined by a pair of opposed first sides and a pair of opposed second sides, a plurality of spaced apart support members extending from the base along the first sides, and a coil support structure extending from the base at each of the second sides. Each support member includes a first portion and a second portion, the first portion extending from the base and the second portion extending from the first portion, with a gap is defined between adjacent support members. The winding abuts the first portion of at least some of the spaced apart support members and is at least partially secured by the second portions of the support members. The winding abuts each of the coil support structures, and is curved in a saddle shape.

38 Claims, 6 Drawing Sheets

U.S. PATENT DOCUMENTS

| | | |
|---|---|---|
| 5,500,994 A | 3/1996 | Itaya |
| 5,549,781 A | 8/1996 | Schotter |
| 5,664,315 A | 9/1997 | Unterseh |
| 5,773,724 A | 6/1998 | Unterseh |
| 5,803,395 A | 9/1998 | Tanaka et al. |
| 6,104,126 A | 8/2000 | Gilmore |
| 6,311,389 B1 * | 11/2001 | Uosaki et al. ............... 29/605 |
| 6,469,604 B1 | 10/2002 | Palkovich et al. |
| 6,763,572 B2 | 7/2004 | Bird et al. |
| 7,383,010 B2 | 6/2008 | Isayama et al. |
| 7,866,218 B2 * | 1/2011 | Lincoln et al. ............ 73/861.12 |
| 2002/0014996 A1 | 2/2002 | Keilen |
| 2002/0171312 A1 * | 11/2002 | Wang et al. .................. 310/208 |
| 2003/0131467 A1 | 7/2003 | Kogler et al. |
| 2008/0022781 A1 | 1/2008 | Huybrechts et al. |
| 2008/0252408 A1 | 10/2008 | Joachim et al. |
| 2009/0051241 A1 * | 2/2009 | Wiezoreck .................... 310/195 |

FOREIGN PATENT DOCUMENTS

| | | |
|---|---|---|
| EP | 0153131 A2 | 8/1985 |
| EP | 0768539 A2 | 4/1997 |
| JP | 07128105 A | 5/1995 |
| JP | 2000055708 A | 2/2000 |

* cited by examiner

COMPLIANT COIL FORM

BACKGROUND

The present invention relates to coil forms, magnetic coils utilizing coil forms, and methods of making the same.

Magnetic coils having a saddle shape, referred to simply as saddle coils, are utilized in devices such as magnetic flowmeters. In a typical magnetic flowmeter, a pair of saddle coils is secured to exterior portions of a cylindrical pipe, through which a fluid passes. One or more electrodes typically extend through the pipe, which generally includes a non-conductive liner, and flow through the pipe is sensed as the fluid moves in a direction generally perpendicular to a primary magnetic field generated by the saddle coils. Such flowmeters are useful for sensing, measuring and controlling industrial processes in industrial process facilities, as well as in other settings.

A typical saddle coil for a magnetic flowmeter is made by wrapping a coil winding about a permanent fixture in a flat (i.e., planar) orientation, then wrapping the winding with a tape or fiberglass material that covers top and bottom portions of the winding. Next, the winding is removed from the fixture and placed over part of a cylinder to bend it to a desired saddle shape. Then a coating on the winding is bonded together to harden the winding in the desired shape. Lastly, the winding assembly is secured to a mounting location on a pipe using conventional threaded mechanical fasteners (e.g., studs, bolts and clamps). The tape (or fiberglass) is utilized because an insulative coating on the wire of the winding is relatively thin, and during use the saddle coil may be exposed to vibrations and other conditions that can wear away the insulative coating and pose a risk of shorting the wire to the pipe on which it is installed. The tape also helps hold the wire of the winding together during bending and bonding operations. However, the tape and clamps utilized in such prior art coils are cumbersome during fabrication.

Therefore, an alternative winding and manufacturing method is desired.

SUMMARY

A coil assembly for a magnetic flowmeter according to the present invention includes a coil form and a winding wound about the coil form. The coil form includes a base defining a loop defined by a pair of opposed first sides and a pair of opposed second sides, a plurality of spaced apart support members extending from the base along the first sides, and a coil support structure extending from the base at each of the second sides. Each support member includes a first portion and a second portion, the first portion extending from the base and the second portion extending from the first portion, with a gap is defined between adjacent support members. The winding abuts the first portion of at least some of the spaced apart support members and is at least partially secured by the second portions of the support members. The winding abuts each of the coil support structures, and is curved in a saddle shape.

DETAILED DESCRIPTION

In general, the present invention relates to a coil form, a saddle coil assembly, and a method of making the same. The saddle coil assembly can be configured for use in a magnetic flowmeter suitable for use sensing, measuring and controlling industrial processes in industrial process facilities, for example. The assembly includes a coil winding wrapped around the coil form, which helps define a shape of the coil assembly and also helps secure the completed coil at an installation location. The coil form allows the winding to be wrapped in a substantially flat or planar orientation, then deflected to a desired saddle shape while still held by the coil form. The winding and the coil form can then both be secured to a desired installation location in a relatively simple and efficient manner. The coil form includes support members that are spaced apart by "kerf cuts" (similar to those used in woodworking) that allow the coil form and associated coil to be bent to a desired saddle shape, with pivoting movement occurring between adjacent support members such that the coil form is deflected in a segmental manner. The support members of the coil form extend to cover a top portion of the winding, while a loop-shaped and substantially continuous base of the coil form is positioned between a bottom of the winding and a structure (e.g., pipe) where the winding is installed. Bendable tabs can also be provided, for instance ones integrally formed with support members of the coil form, that are bent over the winding to help securely fasten the winding to a desired location and which obviate a need to additional, conventional, mechanical clamps. Additional details and benefits of the present invention will be appreciated in view of the discussion that follows.

Figure 1:
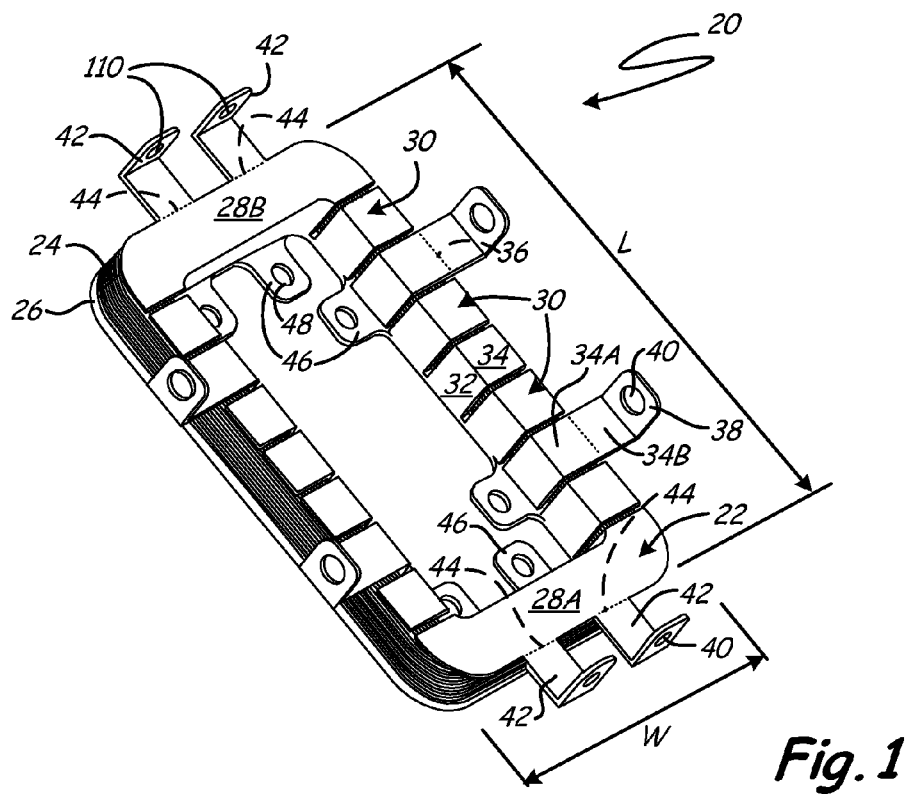
FIG. 1 is a perspective view of a coil assembly according to the present invention prior to bending.
Figure 2:
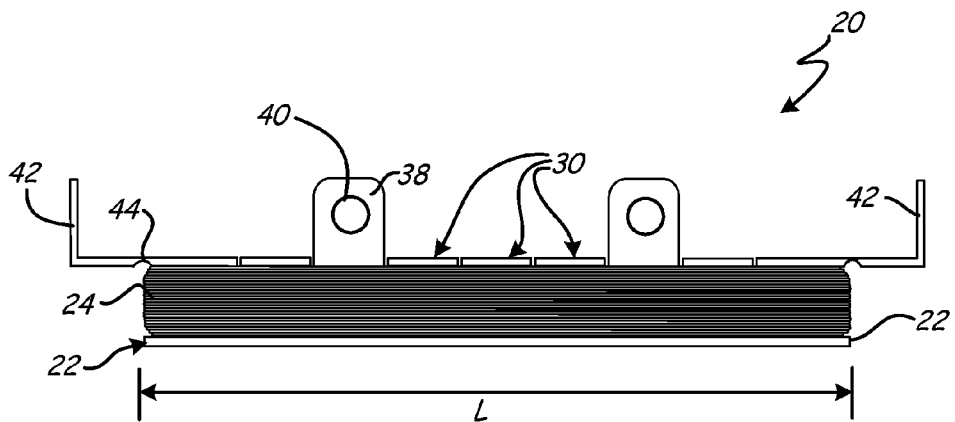
FIG. 2 is a side view of the coil assembly of FIG. 1

FIG. 1 is a perspective view of a coil assembly 20, shown in a substantially flat (or planar) configuration. FIG. 2 is a side view of the coil assembly 20 shown in the same substantially flat configuration. The coil assembly 20 includes a coil form 22 and a winding 24. In one embodiment, the winding 24 is made from self-bonding magnet wire, for instance, a copper wire having an electrically insulative coating thereupon and a bondable coating arranged on the electrically insulative coating as a top coat. The bondable coating allows turns of the winding 24 to bond together to harden the winding 24 in a desired shape. The bondable coating is configured to be bondable under conditions where the electrically insulative coating is not. For example, the bondable coating can by an epoxy having a softening temperature (e.g., about 150-200° C.) that is lower than that of the electrically insulative coating. Alternatively, the bondable coating can be reflowable using a solvent or other material (e.g., copolymerization) in such a way that bonding of adjacent turns of the winding 24 occurs while the underlying electrically insulative coating remains stable. Suitable self-bonding magnet wire is available from MWS Wire Industries, Westlake Village, Calif.

In the illustrated embodiment, the coil form 22 includes a base 26, first and second coil support structures 28A and 28B (which can each be substantially L-shaped in cross-section), and a plurality of support members 30. The coil form 22 can be made of a polymer material, resin-impregnated paper, wood, metal, or other suitable materials. It is generally preferable for the coil form 22 to be made of an electrically insulative material that permits a suitable degree of flexibility.

The base 26 has a substantially planar configuration, and defines a rectangular loop having a central opening, a pair of opposed first sides of length L and a pair of opposed second sides of width W. In the illustrated embodiment the length L is longer than the width W, though it will be recognized that other relationships between the length L and the width W are possible in further embodiments. In alternative embodiments, the loop defined by the base 26 can be triangular, circular, or have any other shape.

The first coil support structure 28A is located at one of the second sides of the base 26 and the second coil support structure 28B is located at the opposite second side of the base 26. In the illustrated embodiment, each coil support structure 28A and 28B extends from an inner edge of the base 26 at the central opening of the loop. The first and second coil support structures 28A and 28B can be integrally formed with the base 26.

A total of seven spaced-apart support members 30 are located along each of the first sides of the base 26, extending from inner edges of the base 26 at the central opening of the loop. In alternative embodiments, a greater or lesser number of support members 30 can be provided, as desired. The support members 30 can be integrally formed with the base 26. A gap (or groove or "kerf cut") is defined between adjacent ones of the spaced-apart support members 30. Each support member 30 includes a first portion 32 that extends from the base 26 and a second portion 34 that extends from the first portion 32. The first portion 32 and the second portion 34 can be substantially planar. In the illustrated embodiment, the first portion 32 is arranged at approximately 90° relative to an adjacent region of the base 26, and the second portion 34 is arranged at approximately 90° relative to the first portion 32 and substantially parallel to the adjacent region of the base 26.

The coil support structures 28A and 28B and the support members 30 collectively define a channel having an open face. The channel of the coil form 22 accepts and retains the winding 24, while gaps or "kerf cuts" formed through the channel structure permit bending of the coil form 22, as explained in greater detail below.

In the illustrated embodiment, some of the support members 30 include additional features for securing the coil form 22 to a desired location. The second portion 34 includes a first substantially planar segment 34A and a second substantially planar segment 34B joined together by a hinge 36. As shown in FIGS. 1 and 2, the first and second segments 34A and 34B are arranged in a substantially coplanar configuration, which helps provide unobstructed access to wrap turns of the winding 24 about the coil support structures 28A and 28B and the support members 30. The hinge 36 can be configured as a substantially linearly-extending thinned region of the second portion 34, with the first and second segments 34A and 34B integrally joined by the hinge 36, to permit flexure of the material of the second portion 34. The hinge 36 permits the second segment 34B to be pivotally movable relative to the first segment 34A about an axis defined by the hinge 36. A third portion 38 is provided for the support members having hinges 36, with the third portion 38 extending from the second segment 34B of the second portion 34. In the illustrated embodiment, the third portion 38 is substantially planar and is arranged at approximately 90° relative to the second segment 34B of the second portion 34. A fastening feature 40 is formed at the third portion 38. In the illustrated embodiment, the fastening feature is a hole for accepting a fastener (not shown in FIGS. 1 and 2), but in alternative embodiments can be a snap or zipper feature able to be engaged with complementary fastening features (e.g., opposite support members 30 could wrap around an adjacent installation structure and connect their respective fastening features 40 together to secure the coil form 22).

Bendable members 42 (which are illustrated as being substantially L-shaped in cross-section) each with fastening features 40 are provided in the illustrated embodiment extending from the coil support structures 28A and 28B at hinges 44. Two spaced apart bendable members 42 can extend from each of the coil support structures 28A and 28B. Each bendable member 42 is pivotally movable relative to the coil support structures 28A and 28B about its respective hinge 44.

Optional supplemental tabs 46 each having a fastening feature 48 can extend from the base 26 into the central opening of the loop. Some or all of the supplemental tabs 46 can be aligned with the support members 30 or the bendable members 42 to form a continuous web of material between the respective fastening features 40 and 48 to help secure the winding 24. In this way, the support members 30 and the bendable members 42 act as straps to help secure the coil form 22 and the coil 24 at a desired location.

Figure 3:
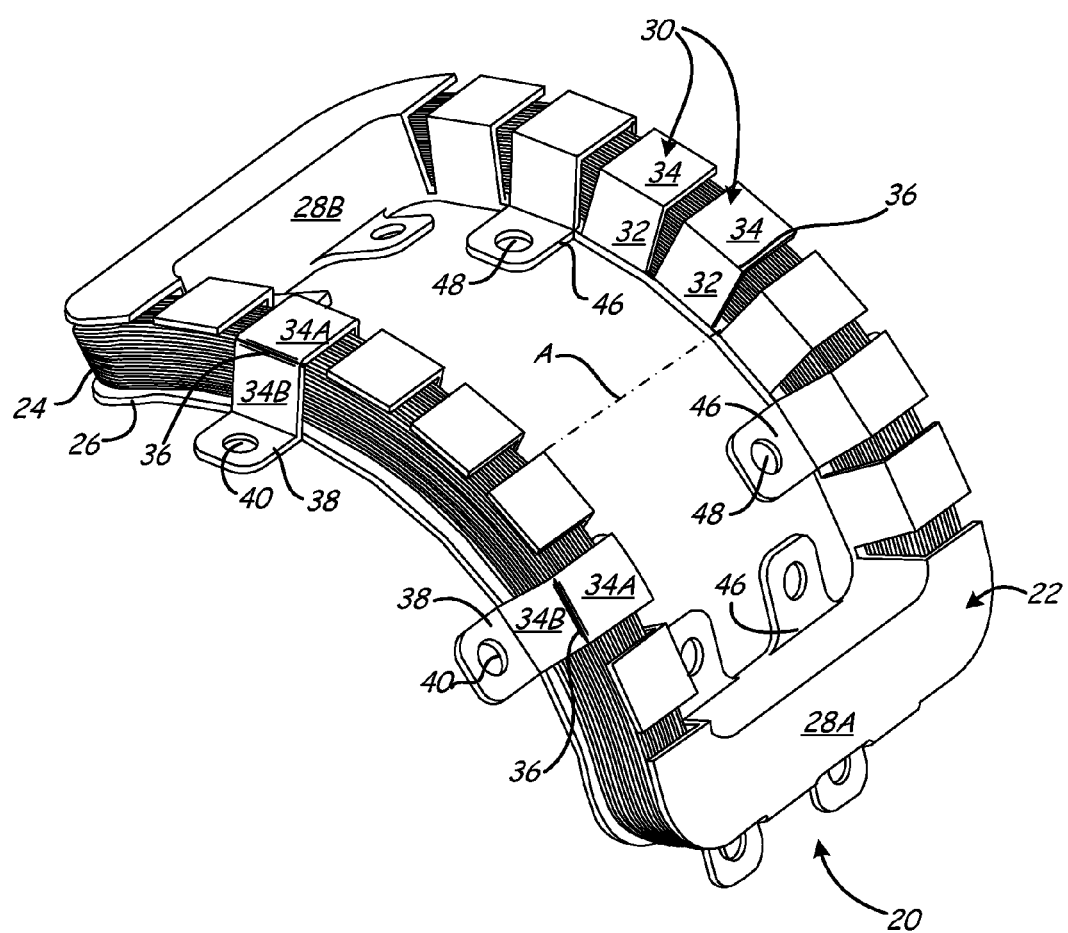
FIG. 3 is a perspective view of the coil assembly of FIGS. 1 and 2 bent to a saddle shape.

FIG. 3 is a perspective view of the coil assembly 20 bent to a saddle shape. The desired bent shape can be controlled by bending the coil form 22 about an object of a desired curvature, such as a suitable fixture or installation structure. As shown in FIG. 3, an axis A is defined along the base 26 at the gap between adjacent ones of the support members 30 of the coil form 22. When the coil assembly 20 is bent, adjacent ones of the support members 30 pivot relative to each other about the axis A, such that the second portions 34 generally move apart from one another and a size of the gap between the support members 30 increases. Bending of the coil assembly 20 further causes the base 26 of the coil form 22 to flex at discrete locations substantially aligned with the axes A. In this way, the coil form 22 deflects in a segmented manner when bent, with portions of the base 26 in between the axes A maintaining a substantially planar configuration while the overall coil assembly 20 assumes the saddle shape. The gaps between the support members 30 enable the support members to cover a top portion of the winding 24 while still allowing the coil form 22 to flex to the saddle shape. The presence of the second portions 34 at the top of the winding 24 is beneficial for helping to protect the winding 24 from wear and contact with other objects that might otherwise produce an electrical short.

Figure 4:
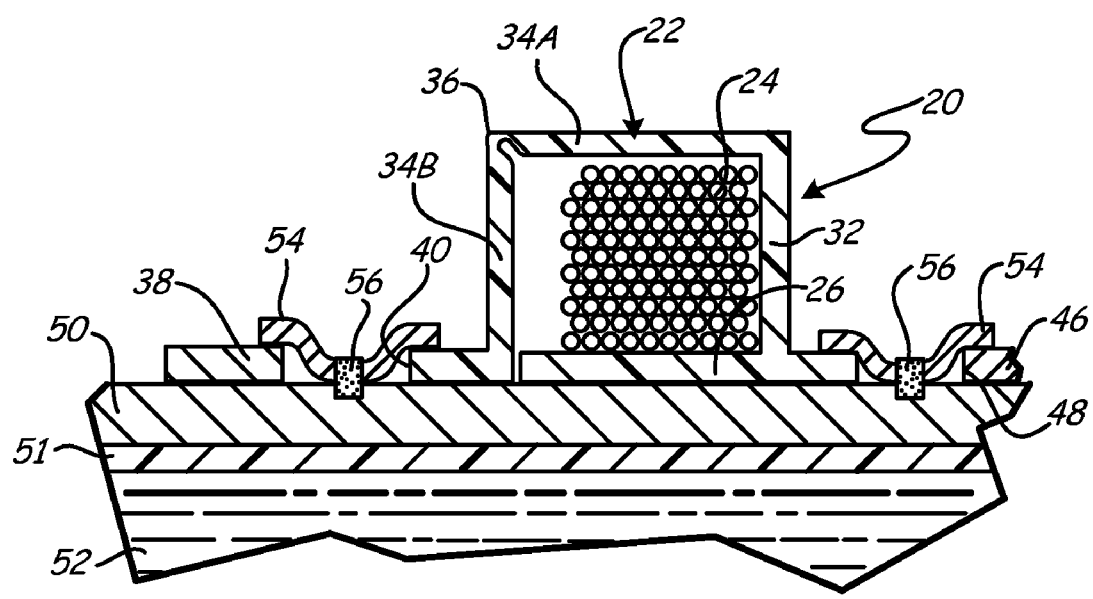
FIG. 4 is a cross-sectional view of a portion of the coil assembly of FIGS. 1-3 secured at an installation location.
Figure 5A:
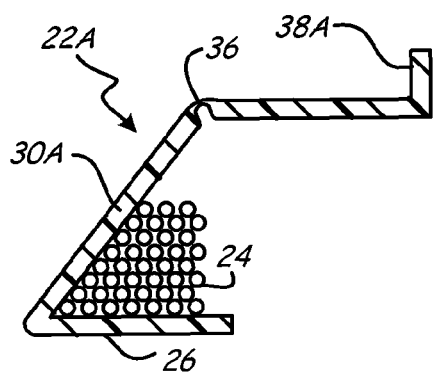
FIGS. 5A-5D are cross-sectional views of portions of various alternative embodiments of coil forms according to the present invention.
Figure 5B:
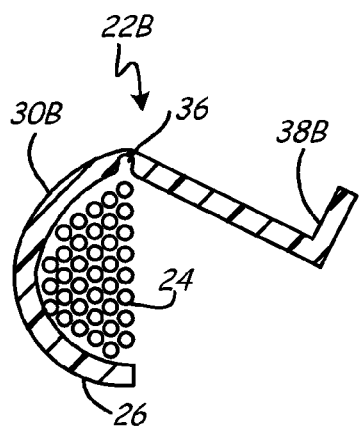
Figure 5C:
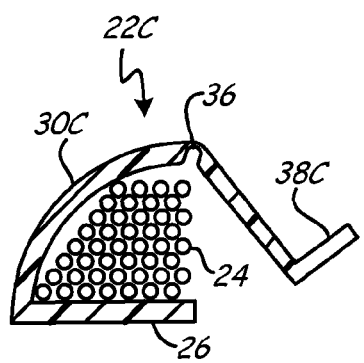
Figure 5D:
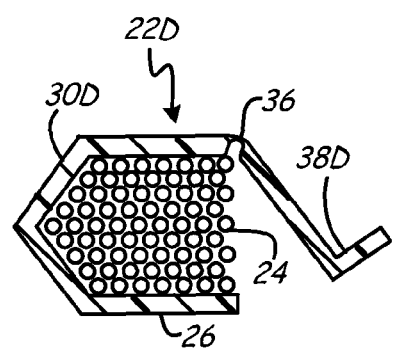

FIG. 4 is a cross-sectional view of a portion of the coil assembly 20 secured to an exterior of a pipe 50, which contains an electrically insulative lining 51 and a fluid 52, at an installation location. As shown in FIG. 4, the base 26 of the coil form 22 is positioned against an exterior surface of the pipe 50 and the hinge 36 is deflected such that the second segment 34B of the second portion 34 is arranged at approximately a right angle relative to the first segment 34A and the third portion 38 is positioned against the exterior surface of the pipe 50. The supplemental tab 46 is also positioned against the exterior surface of the pipe 50. Fasteners 54, which in the illustrated embodiment have a shape resembling a washer with a central depression and an elevated outer edge, are positioned at the fastening features 40 and 48 of the third portion 38 of the support member 30 and the supplemental tab 46 and secured with spot welds 56 to the exterior of the pipe 50. The fasteners 54 thus secure the coil assembly 20 to the pipe. It should be noted that the fasteners 54 can have other configurations in alternative embodiments. For example, the fasteners 54 can alternatively be studs welded to the pipe 50 and secured to the coil form 22 with suitable nuts.

A coil form according to the present invention can have numerous configurations in alternative embodiments. FIGS. 5A-5D are cross-sectional views of portions of various alternative embodiments of coil forms 22A-22D, respectively. The coil forms 22A-22D are generally similar to the coil form 22 described above. However, each of the coil forms 22A-22D has a strap member 30A-30D, respectively, with a different cross-sectional shape and/or orientation relative to the base 26. Each of the coil forms 22A-22D also forms a bendable portion 38A-38D, respectively, that can pivot about the hinge 36. It should be noted that the embodiments of the coil forms 22A-22D are show by way of example and not limitation, and additional configurations are possible according to the present invention.

Figure 6:
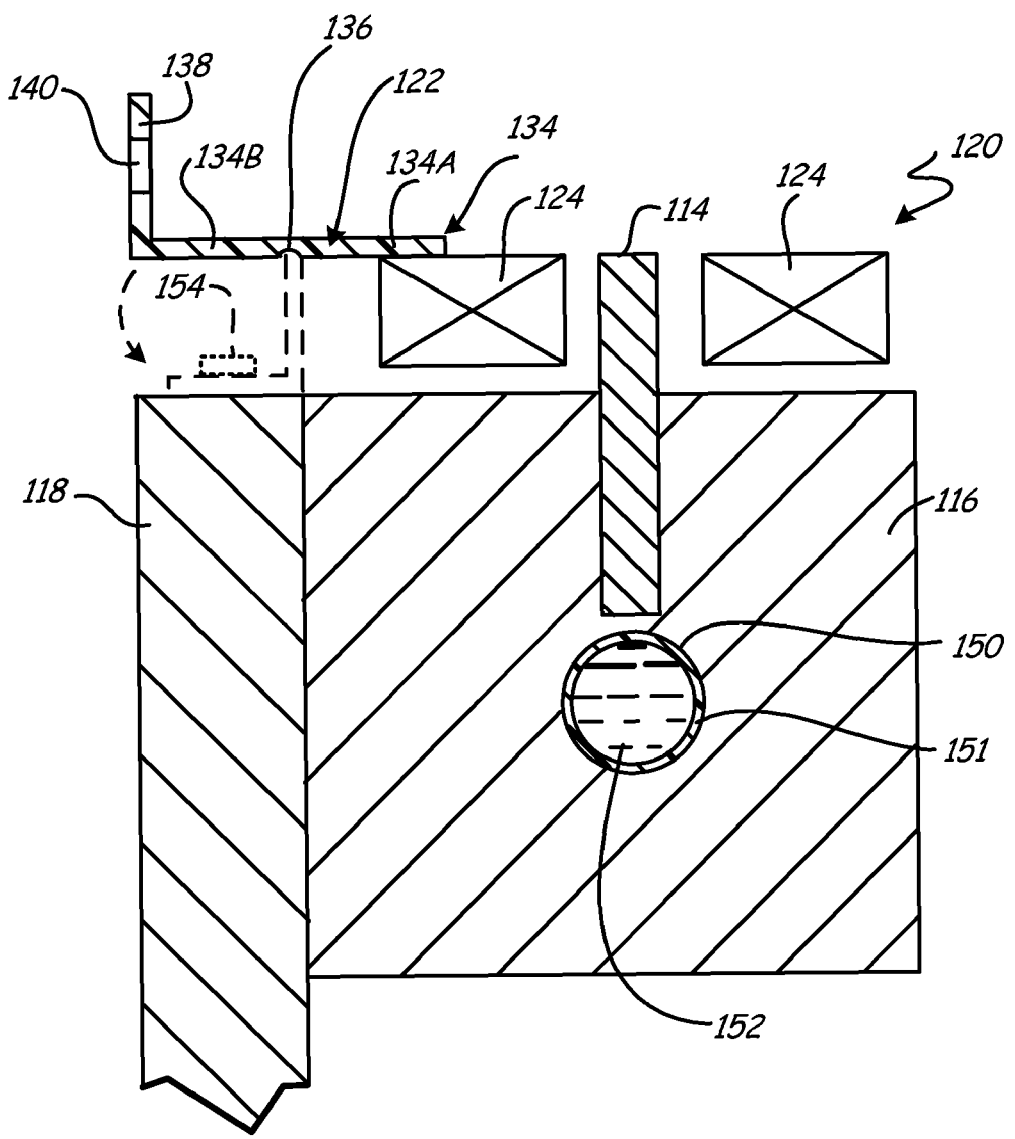
FIG. 6 is a cross-sectional view of an alternative embodiment of a coil assembly according to the present invention.

Features of the present invention can be implemented in a variety of ways. For instance, FIG. 6 depicts an alternative embodiment of an assembly according to the present invention that utilizes a flexible tab-like support member to facilitate installation but does not require all of the features of the coil form 22 described above (though such a coil form could optionally be utilized). FIG. 6 is a cross-sectional view of a magnetically permeable core piece 114, a first structure 116, a second structure 118, and an alternative embodiment of a coil assembly 120. In the illustrated embodiment, the coil assembly 120 includes a coil 124 and a strap apparatus 122 secured to the coil 124 (e.g., by being an integral part of a coil form about which the coil 124 is wrapped, or in any other suitable manner). The strap apparatus 122 includes a portion 134 having first segment 134A and a second segment 134 joined by hinge 136, and another portion 138 extending from the second segment 134B. A fastening feature 140 is located at the portion 138. A passageway 150 is defined within the first structure 116, with an electrically insulative lining 151 positioned therein, within which a fluid 152 can flow. The core piece 114 extends from the coil 124 through the first structure 116 to a location adjacent to the passageway 150. The second structure 118 is located adjacent to the first structure 116, and is attached to the first structure 116 to provide structural support. The strap apparatus 122 can be deflected at the hinge 136, and a fastener 154 (shown in phantom) positioned at the fastening feature 140 to secure the coil assembly 120 to the second structure 118 relative to the first structure 116. Alternatively, the fastener 154 could be attached directly to the first structure 116.

Figure 7:
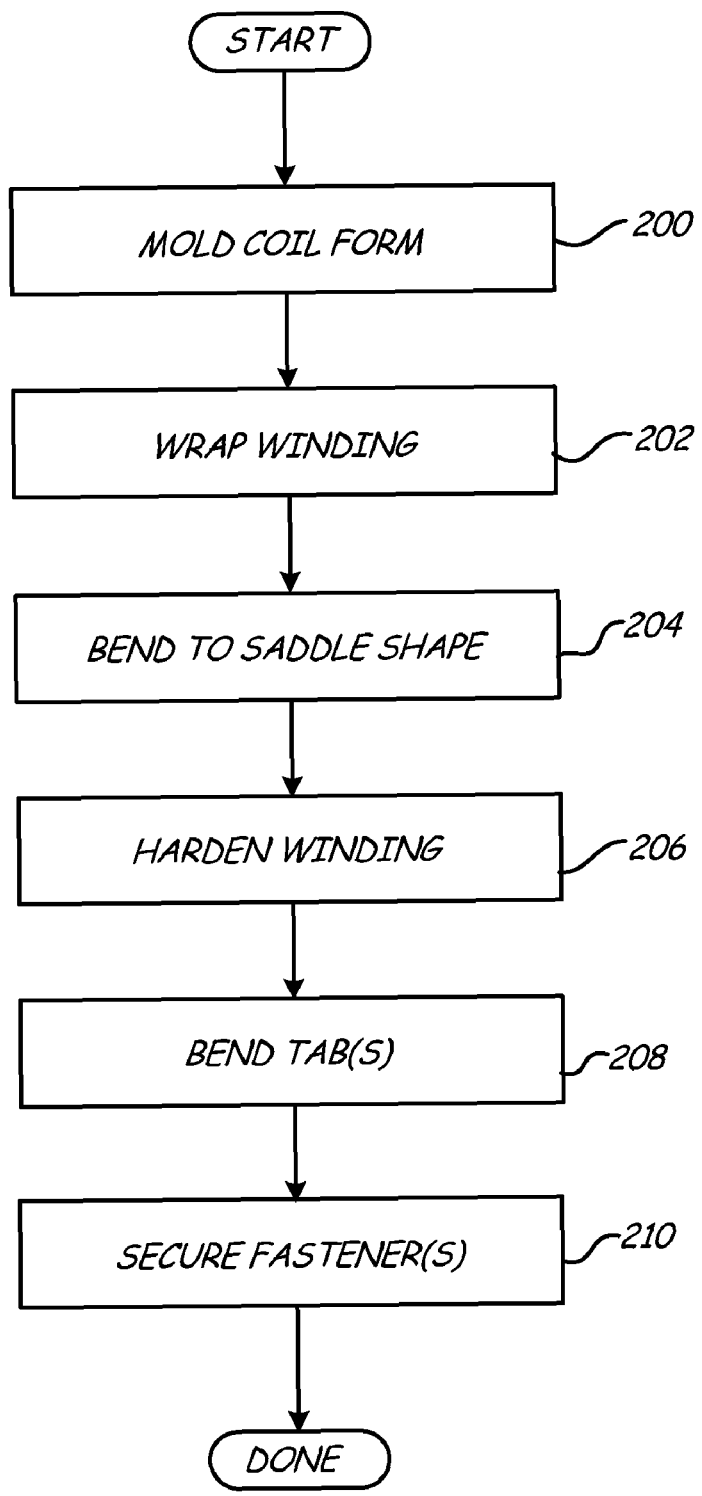
FIG. 7 is a flow chart of a method of making and installing a coil assembly according to the present invention.

FIG. 7 is a flow chart of a method of making and installing a coil assembly according to the present invention. Initially, a coil form (or strap apparatus) is molded from a polymer material (step 200). In alternative embodiments, the coil form (or strap apparatus) can be made of other materials, and can be fabricated using other processes, such as stamping, cutting, milling and other known processes. Next, a winding is wrapped into a coil shape in a substantially flat or planar orientation (step 202). The winding can be wrapped around structures of the coil form. Next, the winding is bent to a saddle shape (step 204). A suitable fixture can be used to control bending of the winding to a desired saddle shape. As previously discussed, when then winding is wrapped about a coil form according to the present invention, the coil form is bent is a segmental manner into the saddle shape along with the winding. After bending, the winding is hardened (step 206). Where the winding is made of a self-bonding magnet wire, the winding can be bonded by application of heat from an external heat source, running current through the winding to generate heat, application of a solvent, copolymerization, or other suitable processes.

Tabs (or straps, support members or other bendable structures) are then bent over portions of the winding (step 208). When the winding is positioned at a desired installation location, one or more fasteners are secured to attach the winding assembly to the installation location (step 210). The fasteners can be secured to the bent tabs other portions of the coil form.

It should be noted that the method of making and installing the coil assembly can include additional steps not specifically mentioned. Furthermore, particular steps can be omitted in certain embodiments. For instance, bendable tabs can be utilized for installing a coil assembly of nearly any configuration, and the steps for making the coil form can be omitted. Furthermore, the use of bendable tabs can be omitted and the coil form can be secured to the installation location in a conventional manner.

Those of ordinary skill in the art will recognize that the present invention provides numerous advantages and benefits. For example, the present invention provides a coil assembly that helps to protect an associated winding from damage or wear during use, thereby helping to reduce a risk of shorting. Moreover, the present invention provides a coil assembly that is relatively easy to make and install. Additional features and benefits will be appreciated in view of the entirety of the present disclosure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, a size and shape of a coil form according to the present invention can vary as desired for particular applications.

The invention claimed is:

1. A coil assembly for a magnetic flowmeter, the assembly comprising:
    a coil form comprising:
        a base defining a loop with a central opening, the loop having a rectangular shape defined by a pair of opposed first sides and a pair of opposed second sides, wherein the first sides are longer than the second sides;
        a plurality of spaced apart support members extending from the base along the first sides, wherein each support member includes a first portion and a second portion, wherein the first portion extends from the base and the second portion extends from the first portion at an angle relative to the first portion, and wherein a gap is defined between adjacent support members; and
        a coil support structure extending from the base at each of the second sides of the loop; and
    a winding wound about the coil form, wherein the winding abuts the first portion of at least some of the plurality of spaced apart support members and is at least partially secured by the second portions of the support members, wherein the winding abuts each of the coil support structures, and wherein the winding is curved in a saddle shape.

2. The assembly of claim 1, wherein the coil form comprises a polymer material.

3. The assembly of claim 1, wherein the winding comprises an electrically conductive material have a first coating thereupon and a second coating arranged as a top coat over the first coating, the first coating being electrically insulative and the second coating configured to bond together adjacent turns of the winding.

4. The assembly of claim 3, wherein the second coating has a bonding temperature of approximately 150-200° C.

5. The assembly of claim 1, wherein the base of the coil form defines substantially planar regions each located adjacent to a corresponding first portion of one of the support members, and wherein the base of the coil form is deflected at spaced apart locations each adjacent to one of the gaps between adjacent support members.

6. The assembly of claim 5, wherein the first portion of each support member is substantially planar, wherein the second portion of each support member is substantially planar, and wherein the second portion of each support member is arranged substantially parallel to an adjacent one of the substantially planar regions of the base.

7. The assembly of claim 1, wherein the second portion of each support member is arranged substantially parallel to an adjacent region of the base.

8. The assembly of claim 1, wherein the first portion of each support member is arranged at approximately 90° relative to an adjacent region of the base, and wherein the second portion of each support member is arranged at approximately 90° relative to the first portion.

9. The assembly of claim 1 and further comprising:
a first tab comprising:
  a first tab portion extending from the base of the coil form;
  a second tab portion extending from the first tab portion;
  a hinge located at the second tab portion;
  a third tab portion extending at an angle from the second tab portion; and
  a fastening feature located at the third tab portion for securing a fastener to the tab.

10. The assembly of claim 9, wherein the second tab portion is bent at the hinge, such that third tab portion is positioned adjacent to the base of the coil form.

11. The assembly of claim 9, wherein the tab is located adjacent at least one of the support members.

12. The assembly of claim 9 and further comprising:
a pipe having a substantially cylindrical shape, wherein the base of the coil form is positioned upon an exterior surface of the pipe; and
a fastener engaged between the fastening feature and the pipe to secure the coil form to the pipe.

13. The assembly of claim 9, the further comprising:
a supplemental tab extending from the base of the coil form, wherein the supplemental tab is substantially aligned with the first tab portion of the first tab.

14. The assembly of claim 9, wherein the third tab portion is arranged at approximately 90° relative to the second tab portion.

15. The assembly of claim 9, wherein the hinge comprises a substantially linearly-extending thinned region of the second tab portion.

16. The assembly of claim 9, wherein the hinge positions adjacent regions of the second tab portion at approximately 90° relative to each other.

17. A method of making a saddle coil for a magnetic flowmeter, the method comprising:
providing a coil form, wherein the coil form includes a base forming a loop and a plurality of support members, the support members each having a substantially planar proximal portion attached to the base and a distal portion;
wrapping a winding about the coil form in a substantially flat orientation, wherein the wrapped winding is adjacent to both the base and the plurality of support members;
bending both the coil form and the winding to a saddle shape, wherein the bending step comprises:
  pivoting adjacent ones of the support members relative to each other about an axis defined along the base between the adjacent support members and orthogonal to the proximal portions of the adjacent support members, whereby the distal portions of the adjacent support members are spaced further apart after being pivoted; and
  bending the base of the coil form in a segmented manner at discrete locations substantially aligned with the axes between the adjacent support members.

18. The method of claim 17 and further comprising:
hardening the winding in the saddle shape.

19. The method of claim 18, wherein the step of hardening the winding in the saddle shape comprises solvent bonding thermoplastic adhesive top coat on the winding.

20. The method of claim 18, wherein the step of hardening the winding in the saddle shape comprises applying heat from an external heat source to a thermoplastic adhesive top coat on the winding.

21. The method of claim 17 and further comprising:
molding the coil form from a polymer material.

22. The method of claim 17 and further comprising:
bending a tab of the coil form over a portion of the winding, wherein the tab extends from the distal portion of one of the support members.

23. The method of claim 22 and further comprising:
securing a fastener to the bent tab.

24. A coil assembly for a magnetic flowmeter, the assembly comprising:
a coil form comprising:
  a base defining a loop;
  a strap member secured to the base;
  a hinge defined on the strap member; and
  a fastening feature located at the strap member for securing a fastener to the coil form;
a winding wound about the coil form, wherein the hinge is configured to permit movement of at least a portion of the strap such that the strap and the base together substantially surround a portion of the winding; and
a mounting structure positioned adjacent to the coil form, wherein the fastening feature of the coil form is secured to the mounting structure.

25. The assembly of claim 24, wherein the strap member comprises:
a first member extending from the base;
a second substantially planar member extending from the first member;
a third substantially planar member extending from the second substantially planar member;
wherein the hinge is located at the second substantially planar member, and wherein the second substantially planar member is bent at the hinge, such that third substantially planar member portion is positioned adjacent to the base of the coil form.

26. The assembly of claim 25, wherein the first substantially planar member is arranged at approximately 90° relative to an adjacent region of the base, wherein the second substantially planar member forms an approximately 90° angle at the hinge, and wherein the third substantially planar member is arranged at approximately 90° relative to the second substantially planar member.

27. The assembly of claim 24, wherein the winding is curved in a saddle shape.

28. The assembly of claim 24 and further comprising:
a pipe having a substantially cylindrical shape, wherein the base of the coil form is positioned upon an exterior surface of the pipe; and
a fastener affixed to the pipe and engaged to the fastening feature.

29. The assembly of claim 24, wherein the hinge comprises a substantially linearly-extending thinned region of the strap member.

30. The assembly of claim 24, the further comprising:
a supplemental tab member extending from the base of the coil form, wherein the supplemental tab member is substantially aligned with the strap member; and
a fastening feature located at the supplemental tab member.

31. The assembly of claim 30 and further comprising:
a pipe having a substantially cylindrical shape, wherein the base of the coil form is positioned upon an exterior surface of the pipe;
a first fastener affixed to the pipe and engaged to the fastening feature located at the strap member; and
a second fastener affixed to the pipe and engaged to the fastening feature located at the supplemental tab member, wherein a continuous web of material is provided between the fastening features located on the strap member and the supplemental tab member.

32. The assembly of claim 24, wherein the loop defined by the base of the coil form base has a rectangular shape defined by a pair of opposed first sides and a pair of opposed second sides, wherein the first sides are longer than the second sides, the coil form further comprising:
a plurality of spaced apart support members extending from the base along the first sides, wherein each support member includes a first portion and a second portion, wherein the first portion extends from the base and the second portion extends from the first portion at an angle relative to the first portion, and wherein a gap is defined between adjacent support members; and
a coil support structure extending from the base at each of the second sides of the loop.

33. A method of making a saddle coil for a magnetic flowmeter, the method comprising:
providing a coil form;
wrapping a winding about the coil form in a substantially flat orientation;
bending the coil form and the winding to a saddle shape;
hardening the winding in the saddle shape; and
bending a tab of the coil form over a portion of the winding.

34. The method of claim 33 and further comprising:
securing a fastener to the bent tab.

35. The method of claim 33, wherein the step of hardening the winding in the saddle shape comprises solvent bonding thermoplastic adhesive top coat on the winding.

36. The method of claim 33, wherein the step of hardening the winding in the saddle shape comprises applying heat from an external heat source to a thermoplastic adhesive top coat on the winding.

37. The method of claim 33 and further comprising:
molding the coil form from a polymer material.

38. A magnetic flowmeter assembly comprising:
a flow passage defined in a structural member configured to allow a fluid to pass through the structural member;
a magnetic winding positioned adjacent to the structural member;
a core piece extending from the magnetic winding through at least a portion of the structural member to the flow passage, wherein the core piece is configured to conduct magnetic flux; and
a bendable tab secured to the magnetic winding, wherein the bendable tab includes a hinge, and wherein a distal portion of the bendable tab is deflected toward the structural member at the hinge and secured relative to the structural member.

* * * * *